Dec. 22, 1959     C. V. BERGER ET AL     2,918,425
CONVERSION PROCESS AND APPARATUS THEREFOR
Filed March 27, 1958     2 Sheets-Sheet 1
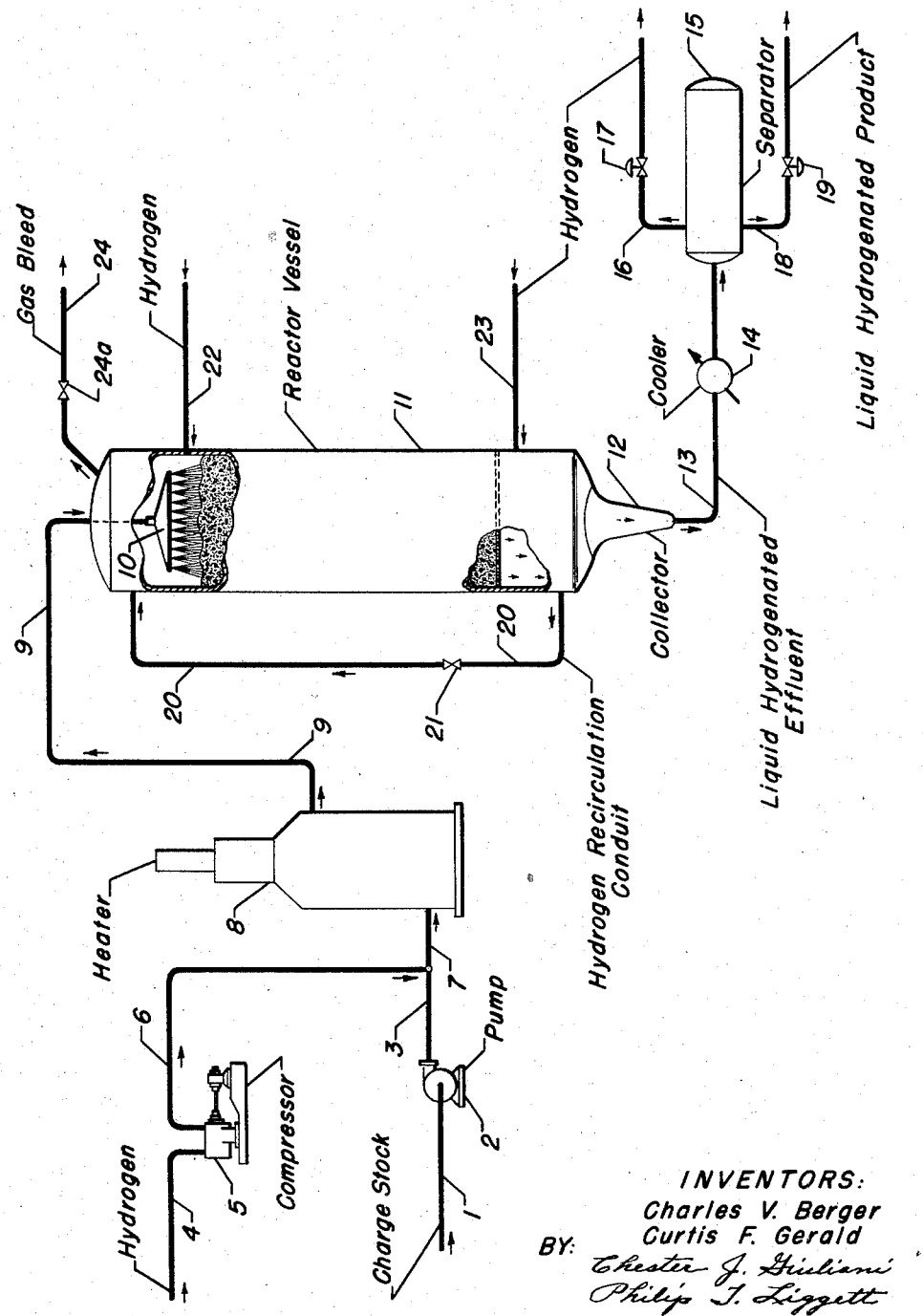
INVENTORS:
Charles V. Berger
Curtis F. Gerald
BY: Chester J. Giuliani
Philip J. Liggett
ATTORNEYS

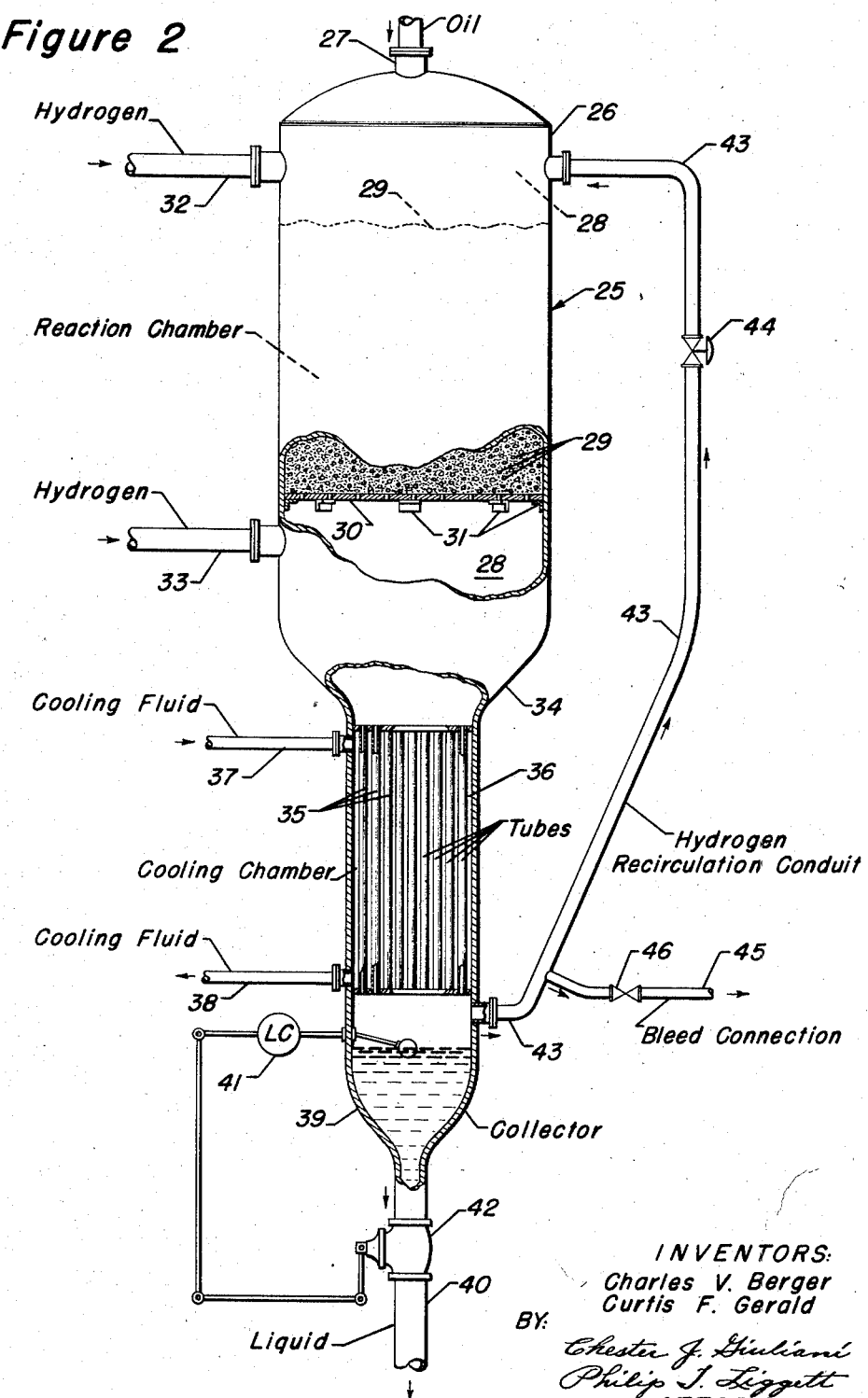

United States Patent Office 2,918,425
Patented Dec. 22, 1959

2,918,425

CONVERSION PROCESS AND APPARATUS THEREFOR

Charles V. Berger, Western Springs, and Curtis F. Gerald, Lake Zurich, Ill., assignors, by mesne assignments, to Universal Oil Products Company, Des Plaines, Ill., a corporation of Delaware Application March 27, 1958, Serial No. 724,340

9 Claims. (Cl. 208—143)

The present application is a continuation-in-part of our co-pending application, U.S. Serial Number 392,021, filed November 13, 1953, now abandoned. The present invention relates to improved methods for effecting intimate contact between fluids and solid catalytic material, and is specifically directed to an apparatus and new methods for the utilization of the same in effecting catalytic reactions in the presence of hydrogen. Processes involving catalytic hydrogenation and catalytic desulfurization are particularly benefited through the adaptation of the instant invention thereto.

Catalytic hydrogenation reactions, and most catalytic desulfurization reactions must, of necessity, be effected in the presence of excessive quantities of hydrogen. The hydrogen is necessarily present as a reactant, and is required in many instances for the suppression of undesirable side reactions, increasing thereby the useful, effective life of the catalyst. Investigation has shown that hydrogen and/or other normally gaseous material is necessary, in many processes utilizing a solid contact catalyst mass, in order to prevent the formation of carbon or other carbonaceous material, and the deposition of the same on the catalyst. The concentration of carbon or carbonaceous material on the catalyst can rapidly attain the degree whereby the activity and stability of the catalyst is effectively nullified, and the catalyst must be either regenerated, or, in a non-regenerative process, replaced.

As hereinbefore stated, the presence of excessive quantities of hydrogen, in a hydrogenation or desulfurization process, will suppress the tendency for carbon or carbonaceous material to be deposited on the catalyst, and, within limits, the higher the ratio of the number of mols of hydrogen to the number of mols of hydrocarbon in the reaction zone, the more effective the suppression of the formation and deposition of said carbon or carbonaceous material. The high hydrogen to hydrocarbon mol ratio has been customarily provided in most hydrogenation reactions by employing the external compressive recycle of gas in order that sufficient hydrogen be present in the atmosphere surrounding the catalyst to provide sufficient hydrogen to replace that which is consumed in the process, and to reduce deposition of carbonaceous material. Through the proper selection of the type catalyst and proper disposition in the reactor, as hereinafter described, it is possible, through the utilization of the method and apparatus of the present invention, to avoid or decrease the amount of compressive external recycle of hydrogen to the reaction zone and maintain a very efficient process.

Heretofore, it has been necessary to maintain the hydrogen to hydrocarbon mol ratio at a high level by means of recycling hydrogen at a sufficiently high rate to prevent undesirable reactions. This recycling has certain inherent disadvantages: first, such recycling is necessarily accomplished at the high process pressures, requiring all of the additional recycle process equipment to be designed to withstand such pressures; secondly, the high rate of recycle requires compressors of sufficient capacity to maintain the necessary hydrogen flow, which compressors must also be designed to withstand the high process pressures. Aside from the initial cost of the compressors, there is also the added cost of power and maintenance. Also, in the event of a power failure to the compressors, the cessation of the recycle gas flow may cause carbon or carbonaceous matter to form on the catalyst immediately, and to such a degree that the process may be rendered inoperable until such time as the catalyst is regenerated or replaced. The carbon or carbonaceous material may, in fact, build up to such a degree on the catalyst that the catalyst cannot be regenerated in a normal manner, if at all. For these reasons it is highly desirable to eliminate the recycle gas system and its necessary appurtenances, while continuing to maintain a sufficient quantity of hydrogen in the reactor. The utilization of our invention makes possible the elimination of, or substantial reduction in, the recycle gas compressors while maintaining an effective hydrogen to hydrocarbon mol ratio within the reaction chamber.

While the present specification is directed to the hydrogenation and desulfurization of hydrocarbons, especially as practiced in the petroleum industry, it is understood that the process and apparatus of the present invention may be used to effect other reactions, which reactions must be performed in the presence of a normally gaseous substance, and/or reactions in which one of the products may be in the liquid form or may be liquefied by cooling within the reaction vessel.

In one embodiment, the present invention provides a process for effecting reactions which comprises introducing a charge stock to a reaction zone containing a body of solid contact material, also introducing an excess of a normally gaseous reactant to said reaction zone and reacting a portion thereof with said charge stock in the presence of said contact material, maintaining a pool of liquid reaction product in the lower portion of said reaction zone thereby forming a gas seal and preventing gas loss from said zone, removing from said pool and from said zone a liquid product stream containing, at most, the small amount of gas that is soluble in the liquid product, and retaining substantially all of the remaining unreacted gas in the reaction zone without substantial compressive recycle of the gas phase.

In one specific embodiment, the present invention relates to a conversion process which comprises introducing a hydrocarbon stock to a reaction zone containing a bed of hydrogenation catalyst, maintaining said zone under a superatmospheric pressure of hydrogen, the amount of hydrogen in the reaction zone being substantially in excess of that which is reactable with said hydrocarbon stock, reacting a portion of the hydrogen with the hydrocarbon stock in the presence of said catalyst, maintaining a pool of resultant hydrogenated liquid product in the lower portion of said zone forming a gas seal, recycling hydrogen without compression from a point adjacent said pool to the upper portion of the reaction zone and preventing gas loss from said zone, removing from said zone a liquid stream containing, at most, the small amount of hydrogen that is soluble in said liquid product and retaining substantially all of the remaining unreacted hydrogen in the reaction zone without compressive recycle of the gas phase.

In another specific embodiment, the present invention relates to a reactor comprising in combination, a vertically arranged chamber, supporting means for a body of solid material in the upper portion thereof and an indirect heat exchange means in the lower portion thereof disposed below said supporting means, an inlet conduit connecting with the upper portion of said chamber, a liquid collector section below said indirect heat exchange means, a liquid discharge conduit extending from said liquid-collector section, and a gas recirculation conduit having one end thereof connected to the chamber between the collector section and said heat exchange means and having its other end connected to the chamber at a point above said heat exchange means.

The main feature of the present invention entails withdrawing substantially only a liquid from the reaction zone. The liquid will contain, however, some dissolved gases, since the reaction is usually effected at high pressure. Thus, normally gaseous substances are not withdrawn from the reaction zone, but remain within the reaction zone as reactants, or as substances that prevent undesirable side reactions. The resulting catalytically converted liquid product is withdrawn through a gas sealing means or a liquid trap. While substantially all of said gaseous material remains in the reaction zone, some of it will be withdrawn as dissolved gas in the liquid itself, however, this is normally only a small portion of the total gaseous material within the reaction zone. In some reactions, there is often formed a gaseous light paraffin, for example methane, which is not completely soluble in the liquid product being withdrawn, and which has the tendency to build up and dilute the principal reactant gas such as hydrogen. It is within the broad scope of our invention to vent a minor amount of such insoluble gas from the reaction zone for the purpose of eliminating these undesirable gases, decreasing thereby the dilution of the reactant gas and the tendency to retard desirable reactions. The amount of gas vented from the reaction zone is normally very small, and the venting may be done periodically or by a small constant bleed. This venting of gas to eliminate undesirable gases from the reaction zone is not necessary for all operations of this process, but only when there is too great a concentration of some undesirable gas or a pronounced tendency for the same to build up within the reaction zone. Substantially, only a liquid product is withdrawn, and it is possible to regulate the amounts of the substances in the reaction zone and thus, within the catalyst bed itself. For example, in a process for hydrogenating a gas-oil over a chromia-alumina catalyst, while charging the gas-oil into the reactor in the liquid state at a hydrogen pressure of 1000 pounds per square inch and a temperature of about 650° F., the gas-oil remains substantially in the liquid phase. Some of the hydrogen is immediately dissolved in the hydrocarbon oil, and is available for effecting hydrogenation. An excess amount of hydrogen must be made available so that the hydrogenating reaction may continue. The thin film of liquid oil that surrounds the catalyst has hydrogen dissolved therein initially, and more hydrogen is supplied from the surrounding hydrogen-rich atmosphere as the hydrogenating reaction proceeds. Therefore, the gas-oil is passed downwardly through the body of catalyst at such a rate that there is always present excess hydrogen in the catalyst bed, including the hydrogen in the catalyst, in the oil and the hydrogen in the voids and closely surrounding atmosphere of the catalyst particles. By maintaining a liquid seal on the exit line, only reacted hydrogen, and that small amount dissolved within the liquid, are withdrawn, and hydrogen is added only in the amount necessary to maintain the pressure. By maintaining a liquid seal on the product exit line, it is possible to maintain a high hydrogen to hydrocarbon mol ratio in the reaction zone and catalyst bed. By maintaining a cooler in the lower portion of the reaction zone, the process may be used even though the products are in the vapor phase at reaction conditions.

When the process is used for the desulfurization of a sulfur-containing charge stock, a sulfur-resistant catalyst such as cobalt sulfide and/or molybdenum sulfide, supported on a suitable refractory carrier material such as alumina, is employed within the reaction zone. Any of the well-known desulfurization catalysts may be utilized, and the scope of the present invention should not be limited to any particular catalyst. Similarly, when the process is used for hydrogenation, any suitable hydrogenation catalyst such as, for example, nickel-kieselghur may be employed. The hydrogenation process should not be limited to the use of any particular catalyst.

The catalyst bed may be situated such that gases can readily move therethrough; that is, the bed arrangement may be such that it has high porosity even in the presence of flowing liquid charge or products. To accomplish this, it is preferred that the catalyst particles be sufficiently large to prevent extremely close packing of the particles, and the interstices from being completely filled by liquid. The catalyst is selected in shapes that facilitate relatively large void spaces; examples of suitable shapes are spheres, solid cylinders, as well as hollow cylinders, rings, saddles, mixtures of irregular shapes and sizes, etc. To further aid in contacting the reactants with the catalyst, non-catalytic material, such as ceramic balls, may be mixed with the catalyst. The catalyst also may be disposed in thin layers in the reactors, and the space between the beds may be used as a redistribution zone wherein the reactants may be redistributed to afford more uniform contact with the next bed of catalyst. For example, it may be desirable to collect all the liquid which may have concentrated at the walls of the reaction chamber, redistributing such liquid across the mass of catalyst. In the type of situation hereinabove described the external recycle conduit (hereinafter described in detail with reference to the attached figures) is not required to obtain efficient "recycle" of the gases, and the process is effected through the utilization of internal "recycle" within the reaction chamber. The elimination of this external recycle conduit is one of the broad embodiments of the present invention. Due to the novelty of the process of the present invention, a special apparatus is preferably employed; the apparatus is hereinafter set forth in detail.

The novelty and utility of the present invention are illustrated further in the accompanying diagrams. Figure 1 illustrates one possible flow of the process. In Figure 1, most of the valves, heat exchangers, coolers, controls and similar appurtenances have been either limited or omitted entirely from the drawing: these are well known in the art, and are not essential to the complete understanding of the particular embodiment illustrated. Figure 2 diagrammatically indicates, in an elevated view, one form of apparatus which is preferred for the process.

Referring to Figure 1, the hydrocarbon oil to be hydrogenated is charged to the process in line 1, picked up by pump 2 and discharged into line 3. The hydrogen in line 4 is picked up by compressor 5 and discharged into line 6. The oil in line 3 and the hydrogen in line 6 are commingled in line 7, and this mixture is passed into heater 8. The temperature of the mixture is raised to the desired level and discharged into line 9. The heated oil and hydrogen are passed in a downward flow into reactor 11 through a spray nozzle 10. The spray nozzle is a convenient means for distributing the hydrocarbon oil and hydrogen evenly over the top of the catalyst bed. In the case herein illustrated, since the process of this invention is particularly adaptable to fixed-bed types of operation, the catalyst is deposited as a fixed bed in reactor 11. In reaction vessel 11, the hydrogenated product, containing dissolved hydrogen, is collected in liquid collector zone 12, and is withdrawn through line 13, directed through cooler 14 and into separator 15.

Reaction vessel 11, as hereinbefore stated, is maintained at a temperature and pressure required to inhibit excessive vaporization of the oil. In reactor 11 there is also a high concentration of hydrogen, and, by controlling the flow of the oil into reactor 11, a high hydrogen to hydrocarbon mol ratio may be maintained therein. A liquid seal is maintained in the liquid collector 12, and may be accomplished through the use of a U-tube arrangement, or preferably by locating a valve in line 13 that is controlled by a liquid level sensing instrument connected to the collector 12: the gas is thereby sealed in vessel 11. Compressor 5 is preferably on pressure control; that is, the compressor operates to maintain the pressure in the reaction vessel 11. Compressor 5 does not act as a recycle compressor, but merely serves the function of adding as much hydrogen as is necessarily consumed in the process.

Reaction vessel 11, as shown, is also equipped with a gas recirculation line 20 containing valve 21, and when the process is operating to the extent that more hydrogen circulation within the reaction zone is desired, valve 21 may be opened and such hydrogen will circulate upwardly through line 20. Line 20 is preferably connected with the lower portion of the reaction vessel at a point above the liquid level in collector 12 and below the catalyst bed, and is connected with the upper portion of the reaction vessel at a point above the catalyst bed. As hereinbefore stated, the catalytic material deposited within reaction zone 11 may be disposed in a manner which facilitates the free flow of gaseous material through the catalyst bed. Thus, the method of the present invention may be effected, in such instances, without the utilization of the external recycle gas line 20. This scheme relates to one of the embodiments of the present invention, that is, the present invention is sufficiently broad to encompass a process utilizing the special apparatus with internal recycle of hydrogen through catalyst voids alone, in which process, line 20 is not in existence. The reaction vessel may also be equipped with lines 22 and 23 which may be used for the introduction of hydrogen into the reaction zone at selected points, and this hydrogen may be obtained from line 6. A gas bleed 24 is also provided on the reaction vessel. This line contains valve 24a which may be periodically operated, or continuously operated, to bleed off a minor portion of gas, as hereinbefore stated.

In separator 15, the liquid hydrogenated product is separated from the dissolved hydrogen. The hydrogenated product is withdrawn from separator 15 through line 18 containing valve 19, and the hydrogen is withdrawn through line 16 containing valve 17. The hydrogen may be sent back to the suction side of compressor 5 to be re-introduced to reaction vessel 11.

Referring now particularly to Figure 2, one embodiment of the invention is illustrated as a reactor, or vertically disposed reaction chamber 25, comprising an enlarged cross-sectional area upper shell portion 26, which is usually fabricated of steel and constitutes a principal housing and structural support for the apparatus. This shell may be provided with any of the well-known insulating material and/or insulating cements to protect the steel walls from the high temperatures that may be employed in the reaction zone. Insulating materials may also be placed between outer shell 26 and a thin inner metal lining. This particular embodiment is not however, herein illustrated. A fluid material, usually a heated oil and/or a heated gas, is passed into the reaction chamber through conduit 27 which is illustrated as located in a center axial position in respect to the reaction chamber. The outer shell 26, with its insulating material defines a cylindrical chamber 28 adapted to contain a mass or bed of catalytic material, usually pellets such as spheres or pills. The catalyst particles 29 are illustrated in the drawing. The catalyst particles 29 are held by a supporting means such as perforated plate 30. Perforated plate 30 may be a metal plate in which suitable size holes have been stamped or drilled and likewise, the perforated plate may comprise larger holes covered by screen of suitable mesh, or the plate may comprise screening that is strengthened by metal rods or bars immediately under the screen. In the embodiment herein illustrated the supporting grid 30 is held in place by supports 31 which are welded or otherwise fastened to the walls of the shell 26. In the illustration, supports 31 are shown as short pieces of angle iron. Hydrogen is introduced above the catalyst bed 29 via conduit 32 and likewise hydrogen is introduced below the catalyst bed 29 via conduit 33. Conduits 32 and 33 may be connected by a common line not illustrated in the drawing. Depending upon the type of operation, conduits 32 and 33 may be provided with suitable valves, and it is within the scope of this invention that one or both of the conduits may be used and likewise the conduits may be used alternately. The reaction chamber 25 is reduced along its length in reducing section 34, and in the lower portion of reaction chamber 25 is the smaller cross-sectional lower portion in which is disposed an indirect heat exchanger. The heat exchanger is herein illustrated as constituting a plurality of tubes. In normal operation the product from the catalytic reaction flows downward through tubes 35 which are enveloped by a cooling fluid enclosed in shell 36. The cooling fluid enters through conduit 37 and is discharged through conduit 38. The cooler may be supplied with suitable baffling to insure proper distribution of the heat transfer fluid throughout the heat exchanger. Any indirect type of heat exchanger may be used with the cooling fluid in the tubes or in the shell. The tubes may be horizontal, or vertical as illustrated, or they may be diagonal. The heat exchanger is chosen so that the free space through the openings or tubes is relatively small. This type of heat exchanger is preferred since the process and apparatus of our invention operates much more efficiently when the heat exchanger or condenser operates somewhat as a diffusion pump. Although we do not intend our invention to be limited to this theory, it appears that the reaction products condense and push or seem to pump the gases down through the condenser and thus to give an internal pumping effect which circulates the light gas, such as hydrogen, throughout the system. The heat exchanger or cooler thus should preferably offer some restriction to the downward gas flow so that the condensing vapors of the large molecules may better direct the light gaseous molecules downward. It is also within the scope of this invention to use a special cooler that is especially adapted to act as a diffusion pump.

Below the cooling chamber is located liquid collector section 39, which section narrows down to outlet conduit 40. The liquid collector section 39 is illustrated as having a liquid level device 41 which operates valve 42. The liquid level device 41 and valve 42 operate so as to maintain a liquid level in liquid collector section 39. In the illustration, a level controller of the type employing a float is shown, however, any of the well-known level sensing devices may be used. Above liquid collector section 39 and below the cooling chamber is located a gas recirculation conduit 43. In this particular embodiment, conduit 43 is illustrated as entering the reaction chamber above the catalyst bed, and this is the preferred location. However, the conduit may re-enter the reaction chamber in the catalyst bed or below the catalyst bed. In operation valve 44 may be opened or may be closed. In an operation in which hydrogen is consumed rapidly, sufficient hydrogen may be introduced through conduit 32 and in this case valve 44 is closed and the hydrogen is circulated completely within the reaction chamber 25, as hereinbefore set forth in the description of Figure 1. Line 45 containing valve 46 is the bleed connection on the system which is operated as hereinbefore discussed.

By suitable modifications reactor 25 of Figure 2 may be used for the reaction vessel 11 of Figure 1.

When a cooling means is employed in the lower section of the reaction chamber, the conditions in the catalyst may be such that there may be complete vaporization of the charge stock and/or products, and, in fact, when a cooler is employed, the charge may be introduced in the vapor phase. In the hydrogenation process, the pressure employed is above atmospheric pressure, and preferably above about 200 pounds per square inch.

Pressures as high as 10,000 pounds per square inch may be used; however, pressures below about 2,000 pounds per square inch are preferred. When the process is used for the hydrodesulfurization of a sulfur-containing hydrocarbon oil, the conditions are substantially the same as for the hydrogenation reaction. However, when the process is used for hydrodesulfurization, a sulfur-resisting catalyst is preferably employed.

From the foregoing specification it can be seen that we have provided a new method and apparatus for effecting catalytic reactions. The foregoing illustrations were intended to show the advantages of a particular flow of the herein disclosed process, and a particular apparatus in which to effect the same. Many other illustrations differing in minor details, but within the scope of this invention, could be cited; hence, the invention should not be unduly restricted thereto.

We claim as our invention:

1. A reactor comprising in combination, a vertically arranged chamber, supporting means for a body of solid catalytic material in the upper portion thereof and an indirect heat exchange means in the lower portion of the chamber below said supporting means, an inlet conduit connecting with the upper portion of said chamber, a liquid collector section in the lower portion of the chamber below said indirect heat exchange means, a liquid discharge conduit extending from said liquid-collector section, and a gas recirculation conduit having one end thereof connected to the chamber between the collector section and said heat exchange means and having its other end connected to the chamber at a point above said heat exchange means.

2. A reactor comprising in combination an elongated vertically disposed chamber having an enlarged cross-sectional area upper portion and a smaller cross-sectional area lower portion, perforate supporting means for a body of solid catalytic material in the upper portion of said chamber and an indirect heat exchange means disposed in said smaller cross-sectional area lower portion thereof of the chamber below said perforate supporting means, an inlet conduit connecting with the upper portion of said chamber and a second inlet conduit connecting to said chamber between said supporting means and said heat exchange means, a liquid collector section in said lower portion of the chamber below said indirect heat exchange means, and a liquid discharge conduit extending from said liquid collector section.

3. A reactor comprising in combination an elongated vertically disposed chamber having an enlarged cross-sectional area upper portion and a smaller cross-sectional area lower portion, perforate supporting means for a body of solid catalytic material in the upper portion of said chamber and an indirect heat exchange means disposed in said smaller cross-sectional area lower portion of the chamber below said perforate supporting means, an inlet conduit connecting with the upper portion of said chamber and a second inlet conduit connecting to said chamber between said supporting means and said heat exchange means, a liquid collector section in said lower portion of the chamber below said indirect heat exchange means, a liquid discharge conduit extending from said liquid collector section and a gas recirculation conduit extending from a point between said heat exchange means and said liquid collection section to the upper portion of said chamber.

4. A process for effecting reactions which comprises introducing a charge stock to a reaction zone containing a body of solid contacting material, also introducing thereto an excess of a normally gaseous reactant, reacting a portion thereof with said stock in the presence of the solid contacting material, maintaining a pool of liquid reaction product in the lower portion of said zone thereby forming a gas seal, preventing gas loss from said zone, removing from said pool and from said zone a liquid product stream containing, at most, only the small amount of gas that is soluble in the liquid product and retaining substantially all of the remaining unreacted gas in the reaction zone without compressive recycle of the gas phase.

5. The process of claim 4 further characterized in that said charge stock is a hydrocarbon material.

6. A process for effecting catalytic reactions which comprises introducing a charge stock to a reaction zone containing a body of catalytic material, also introducing thereto an excess of a normally gaseous reactant, reacting a portion thereof with said stock in the presence of the catalytic material, maintaining a pool of liquid reaction product in the lower portion of said zone thereby forming a gas seal, recycling gas without external compression from a point adjacent said pool to the upper portion of the reaction zone and preventing gas loss from said zone, removing from said pool and from said zone a liquid product stream containing, at most, only the small amount of gas that is soluble in the liquid product and retaining substantially all of the remaining unreacted gas in the reaction zone without compressive recycle of the gas phase.

7. A conversion process which comprises introducing a hydrocarbon stock to a reaction zone containing a bed of hydrogenation catalyst, maintaining said zone under a superatmospheric pressure of hydrogen, the amount of hydrogen being substantially in excess of that which is reactable with said hydrocarbon stock, reacting a portion of the hydrogen with the hydrocarbon stock in the presence of said catalyst, maintaining a pool of resultant hydrogenated liquid product in the lower portion of said zone thereby forming a gas seal, recycling hydrogen without compression from a point adjacent said pool to the upper portion of the reaction zone and preventing gas loss from said zone, removing from said zone a liquid stream containing, at most, only the small amount of hydrogen that is soluble in said liquid product and retaining substantially all of the remaining unreacted hydrogen in the reaction zone without compressive recycle of the gas phase.

8. The process of claim 7 further characterized in that said hydrocarbon stock is introduced in liquid phase to the reaction zone and the temperature and pressure within said zone are sufficient to prevent substantial vaporization of the hydrocarbon.

9. The process of claim 7 further characterized in that said hydrocarbon stock is introduced in the vapor phase to the reaction zone, and the hydrogenated liquid product is condensed in the lower portion of said zone.

References Cited in the file of this patent

UNITED STATES PATENTS

| | | |
|---|---|---|
| 2,602,810 | Montgomery et al. | July 8, 1952 |
| 2,662,846 | Montgomery et al. | Dec. 15, 1953 |